US009372498B2

(12) United States Patent
Fust et al.

(10) Patent No.: US 9,372,498 B2
(45) Date of Patent: Jun. 21, 2016

(54) ROTARY/PUSH OPERATING DEVICE FOR A HUMAN-MACHINE INTERFACE

(71) Applicant: Behr-Hella Thermocontrol GmbH, Stuttgart (DE)

(72) Inventors: Winfried Fust, Lippstadt (DE); Frank Vogt, Lichtenau (DE)

(73) Assignee: Behr-Hella Thermocontrol GmbH, Stuttgart (DE)

( * ) Notice: Subject to any disclaimer, the term of this patent is extended or adjusted under 35 U.S.C. 154(b) by 201 days.

(21) Appl. No.: 14/346,973

(22) PCT Filed: Sep. 27, 2012

(86) PCT No.: PCT/EP2012/069037

§ 371 (c)(1),
(2) Date: Jun. 26, 2014

(87) PCT Pub. No.: WO2013/045528

PCT Pub. Date: Apr. 4, 2013

(65) Prior Publication Data

US 2015/0160683 A1 Jun. 11, 2015

(30) Foreign Application Priority Data

Sep. 27, 2011 (DE) ........................ 10 2011 083 524

(51) Int. Cl.

*H01H 25/06* (2006.01)
*G05G 5/05* (2006.01)
*G05G 1/02* (2006.01)

(Continued)

(52) U.S. Cl.

CPC .. *G05G 5/05* (2013.01); *G05G 1/02* (2013.01); *G05G 1/08* (2013.01); *G05G 5/065* (2013.01); *Y10T 74/20372* (2015.01)

(58) Field of Classification Search

CPC ...................................................... G05G 5/065
USPC ............... 74/10 R, 10.1, 10.15, 10.22, 10.27, 74/10.41, 10.8

See application file for complete search history.

(56) References Cited

U.S. PATENT DOCUMENTS

| | | | | |
|---|---|---|---|---|
| 4,859,922 A * | 8/1989 | Tauchenitz | G05G 1/10 | 310/93 |
| 5,187,630 A * | 2/1993 | MacKay | G05G 1/08 | 200/565 |
| 5,351,161 A * | 9/1994 | MacKay | G05G 1/08 | 360/137 |

(Continued)

FOREIGN PATENT DOCUMENTS

| | | |
|---|---|---|
| DE | 199 64 131 A1 | 6/2001 |
| DE | 101 37 883 A1 | 2/2003 |
| DE | 102 61 284 A1 | 7/2004 |

(Continued)

*Primary Examiner* — William Kelleher
*Assistant Examiner* — Joseph Brown
(74) *Attorney, Agent, or Firm* — Dardi & Herbert, PLLC; Peter S. Dardi

(57) ABSTRACT

The rotary/push operating device (10) for a human-machine interface, in particular for a vehicle component, such as an air conditioning system, is provided with a rotary/push operating element (12) that can be rotated about a guide shaft (14) in a rotary movement and moved axially along the guide shaft (14). Furthermore, the rotary/push operating device (10) has a rolling bearing unit (30) having an outer bearing ring (32), an inner bearing ring (34) and rolling elements (36,38) arranged therebetween, wherein one of the bearing rings (32, 34) is connected with the rotary/push operating element (12) in a rotationally fixed manner and can be rotated therewith.

9 Claims, 2 Drawing Sheets

(51) Int. Cl.
*G05G 1/08* (2006.01)
*G05G 5/06* (2006.01)

(56) References Cited

U.S. PATENT DOCUMENTS

| | | | | |
|---|---|---|---|---|
| 6,420,667 | B1 * | 7/2002 | Miwa | H01H 25/065 200/11 R |
| 6,578,447 | B1 * | 6/2003 | Fraser | G05G 5/06 200/565 |
| 6,867,379 | B2 * | 3/2005 | Hayashi | G05G 1/08 200/4 |
| 7,550,686 | B2 * | 6/2009 | Girke | H01H 9/182 200/11 R |
| 7,579,559 | B2 * | 8/2009 | Schelbert | B60K 37/06 200/4 |
| 2004/0154910 | A1 | 8/2004 | Hayashi | |
| 2011/0061489 | A1 * | 3/2011 | Bulin | G05G 1/12 74/553 |

FOREIGN PATENT DOCUMENTS

| | | | | | |
|---|---|---|---|---|---|
| DE | 10 2004 054178 | A1 | | 5/2006 | |
| DE | 10 2006 018518 | A1 | | 2/2007 | |
| DE | EP 1795990 | A1 | * | 6/2007 | G05G 1/10 |
| DE | 10 2006 057311 | A1 | | 5/2008 | |
| EP | 0 282 817 | A1 | | 9/1988 | |
| EP | 2 381 330 | A1 | | 10/2011 | |
| GB | 2157800 | A | * | 10/1985 | F16D 11/00 |
| GB | 2 186 668 | A1 | | 8/1987 | |
| JP | EP 1528585 | A2 | * | 5/2005 | G05G 1/087 |

* cited by examiner

ROTARY/PUSH OPERATING DEVICE FOR A HUMAN-MACHINE INTERFACE

CROSS REFERENCE TO RELATED APPLICATIONS

This application is a national stage filing of PCT application PCT/EP2012/069037 to Fust et al., filed Sep. 27, 2012, entitled "Rotary/Push Operating Device for a Human-Machine Interface, " which claims priority to German patent application number 10 2011 083 524.5 filed on Sep. 27, 2011, both of which are incorporated herein by reference.

FIELD OF INVENTION

The invention relates to a rotary/push operating device for a human-machine interface, in particular for an operating device of a vehicle.

BACKGROUND OF THE INVENTION

Rotary/push operating devices for data input via a so-called human-machine interface in a vehicle and/or for operating units of a vehicle are known in prior art. Normally, a rotary/push operating device is provided with a rotary/push operating element. By rotating the rotary/push operating element letters, signs or functions are selected and acknowledged by pressing said element. After acknowledgement of such an input a task corresponding to the input is performed.

From DE-A-102 61 284 a rotary operating element is known which is adapted to be moved along its rotary axis when a force acts upon said element. This operating element comprises a toothed portion which is in engagement with a gear wheel to transmit the rotation of the operating element to the gear wheel. The rotary axis of the gear wheel is arranged in parallel to and sideways of the rotary axis of the operating element. This measure allows the operating element to be moved along its rotary axis. The toothed portion itself preferably forms a gear wheel such that a full rotation of the operating element is possible.

Further, in prior art, rotary/push operating devices are known where the rotary/push operating element comprises a central key or a plurality of central keys normally secured against rotation which are arranged inside the rotatable rotary element. These keys are adapted to be depressed and serve for data input and/or acknowledgement of data input. However, the rotary operating element itself is not adapted to be depressed. Examples of the above described prior art rotary/push operating devices are disclosed in DE-A-10 2006 018 518, DE 10-A-2004 054 178, DE-A-199 64 131, DE-A-101 37 883, EP-B-0 282 817 and GB-A-2 186 668.

SUMMARY OF THE INVENTION

It is an object of the invention to provide a rotary/push operating device for a human-machine interface, wherein the rotary/push operating device has a simple design insusceptible to faults for moving a rotary/push operating element in two orthogonal directions.

To achieve this object the invention proposes a rotary/push operating device for a human-machine interface, in particular for a vehicle component, such as an air conditioning system, wherein the rotary/push operating device is provided with

- a rotary/push operating element which is adapted to be rotated in a rotary movement and to be axially moved along the guide shaft,

- a roller bearing unit having an outer bearing ring, an inner bearing ring and rolling bodies arranged therebetween,
- wherein one of the bearing rings is connected in a rotationally fixed manner with the rotary/push operating element and is adapted be rotated therewith,
- a rotation sensor for sensing the rotary movement of the operating element,
- a pressure sensor responding to an axial movement of the rotary/push operating element from a starting position into a depressed position along the guide shaft, and
- a return element for automatically moving back the rotary/push operating element from the depressed position into the starting position,
- wherein the return element directly or indirectly acts upon the roller bearing unit, and
- wherein the other one of the bearing rings (32, 34) is adapted to be guided in an axially movable manner along the guide shaft (14) and is secured against rotation at the guide shaft.

Here, it may further be provided for

- a rotary arresting unit to be arranged between the inner bearing ring and the outer bearing ring or between a first component mechanically coupled with the inner bearing ring and a second component mechanically coupled with the outer bearing ring,
- wherein the rotary arresting unit includes an arresting template provided with arresting recesses and at least one arresting projection moving into and out of one of the arresting recesses,
- wherein the arresting template and the at least one arresting projection are adapted to be moved relative to each other, and
- wherein the arresting template and/or the at least one arresting projection is/are adapted to be elastically moved or deformed.

The rotary/push operating device according to the invention comprises a rotary/push operating element which is supported in a manner rotatable about a rotary axis by means of a rolling bearing unit. Further, the rotary/push operating element is adapted to be axially moved along the guide shaft. The rolling bearing unit comprises an outer bearing ring and an inner bearing ring. Therebetween rolling bodies are arranged. One of the two bearing rings (typically the outer bearing ring) is connected with the rotary/push operating element such that the outer bearing ring is rotated together with the rotary/push operating element when the latter is rotated. The other bearing ring (typically the inner bearing ring) is guided in an axially movable manner along a fixed guide shaft forming the rotary axis and is secured against rotation at the guide shaft. The rotary movement of the rotary/push operating element is sensed by a rotation sensor (an absolute or relative path sensor, for example). Here, an optical sensor in the form of a light barrier or the like or a mechanical sensor in the form of a rotary potentiometer which meshes with the rotary/push operating element or is in rotary connection therewith, for example, is an appropriate choice. Other configurations of rotation sensors are also conceivable. A pushing movement of the rotary/push operating element is detected with the aid of a pressure sensor which responds to depressing of the rotary/push operating element along the guide shaft from a starting position to a depressed position. Such a pressure sensor in its simplest form can be configured as a (end) switch. The automatic return movement of the rotary/push operating element from the depressed position into the starting position is effected by a return element. According to the invention, this return element directly or indirectly acts upon the rolling bearing unit such that the overall rolling bearing and thus the rotary/push operating element are depressed when a depressing force is centrally exerted on the rotary/push operating element, for example.

Alternatively or additionally to the translatory movability of the rolling bearing unit, the rotary/push operating device according to the invention may comprise a rotary arresting unit which is arranged between the inner bearing ring and the outer bearing ring or between a first component mechanically coupled with the inner bearing ring and a second component mechanically coupled with the outer bearing ring. The rotary arresting unit comprises an arresting template having arresting recesses and at least one arresting projection adapted to be moved into and out of one of the arresting recesses. The arresting template and the at least one arresting projection are adapted to be moved relative to each other. The arresting template and/or the at least one arresting projection are adapted to be elastically moved or deformed.

According to a preferred aspect of the invention, the return element acts directly or indirectly on the inner bearing ring of the rolling bearing unit. Here, it may be advantageously provided for the return element to comprise a coil spring. In this connection one or a plurality of return elements may directly or indirectly act upon the rolling bearing unit.

Typically, the rotary/push operating element is of an essentially cap-shaped configuration and has a front side and a circumferential side. The rotary/push operating element appropriately comprises at the front side a fixed key body and at the circumferential side a ring element adapted to be rotated about the key body, wherein the key body is directly or indirectly connected with the inner bearing ring, and the ring element is directly or indirectly connected with the outer bearing ring of the rolling bearing unit.

If in a thus configured rotary/push operating element the fixed key body, i. e. the front side of the cap-shaped rotary/push operating element, is depressed, the overall rotary/push operating element moves downwards together with the rotatable ring element. In the same way, the fixed key body moves downwards when a depressing force is exerted on the ring element of the rotary/push operating element, for example.

For mechanical stabilization of the rotary/push operating element the rolling bearing unit appropriately comprises two rows of rolling bodies axially spaced apart from each other along the guide shaft.

The concept according to the invention allows a rotary/push operating device requiring a minimum installation space to be realized. The device can be realized with a rolling bearing made of a plastic material, namely plastic inner and outer bearing rings. In such a design either the rotary haptics production (e. g. the arresting) or the translatory guiding or both may be integrated. Thus in the case of rotary operating devices with small diameters all the desired mechanical functions can be realized, wherein, at the same time, sufficient space remains for arranging a fixed push button in the center of the rotary/push operating device, for example.

BRIEF DESCRIPTION OF THE DRAWINGS

Hereunder the invention is explained in detail on the basis of an exemplary embodiment and with reference to the drawings in which.

DETAILED DESCRIPTION OF THE INVENTION

Figure 1:
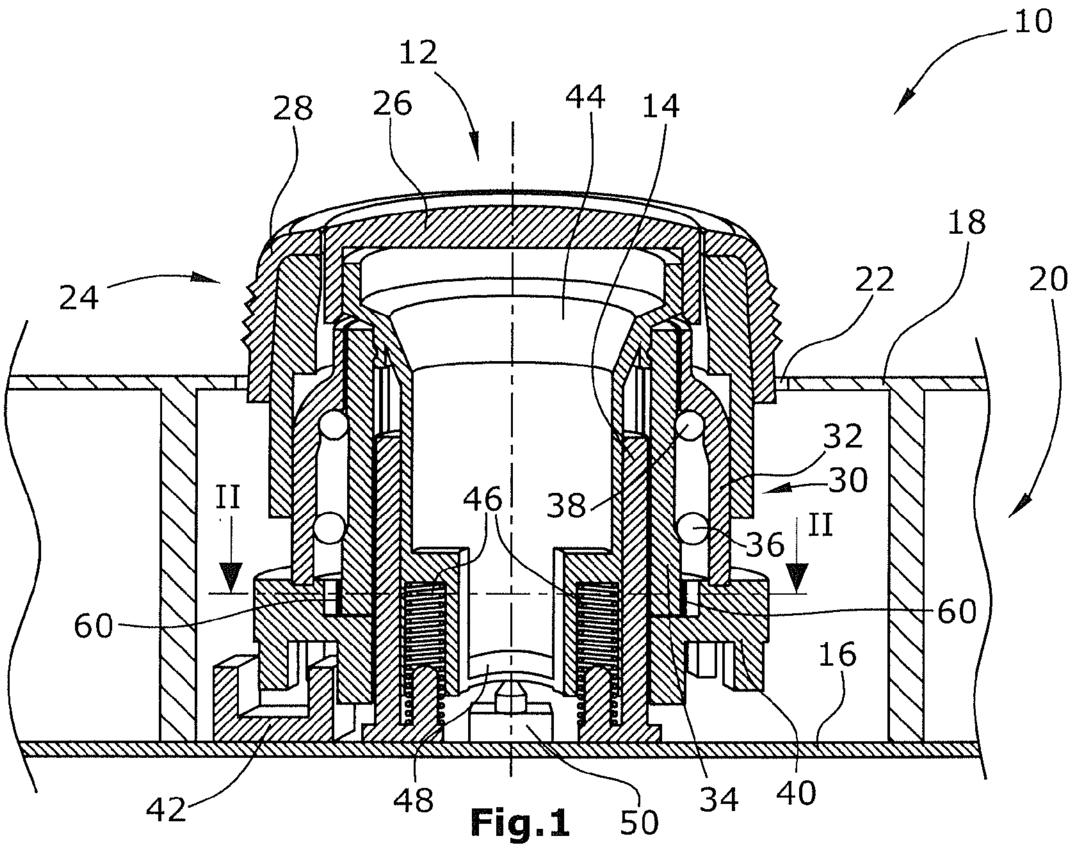
FIG. 1 shows a longitudinal section of a rotary/push operating device according to an exemplary embodiment of the invention.

FIG. 1 schematically shows the setup of a rotary/push operating device 10. This operating device 10 comprises a rotary/push operating element 12 which is rotatably supported about a guide shaft (rotary axis) 14 defined by a hollow shaft. The guide shaft 14 extends upwards from a carrier plate 16 which normally is a circuit board. A front panel 18 of a housing 20 of the rotary/push operating device 10 is arranged in spaced relationship to the carrier plate 16 and surrounds the rotary/push operating element 12.

In the front panel 18 a generally round cavity 22 is formed through which the rotary/push operating element 12 extends upwards.

The rotary/push operating element 12 comprises a cap-shaped upper operating part 24 adapted to be manually gripped and including a central fixedly arranged key body 26 and a rotatable ring element 28 surrounding said key body 26 and being provided with a knurled outer (gripping) face, for example. The key body 26 can only be depressed together with the ring element 28 and is secured against rotation, i. e. does not rotate together with the ring element 28. Thus the key body 26 can be used as a fixed symbol-type or touch-type or the like data input field which does not co-rotate.

In this exemplary embodiment, the rotary/push operating element 12 further comprises a rolling bearing unit 30 including an outer bearing ring 32, an inner bearing ring 34 and two groups of rolling bodies 36, 38 arranged therebetween.

The ring element 28 of the operating part 24 is fixedly connected with the outer bearing ring 32 such that the latter is rotated when the ring element 28 is rotated. The inner bearing ring 34 is secured against rotation and arranged in an axially guided manner at the guide shaft 14.

Below the rotatable outer bearing ring 32 a circular rotating assembly 40 is located which cooperates with a light barrier as a rotation sensor 42. The circular rotating assembly 40 is rotated when the ring element 28 is rotated, and the light barrier, i. e. the rotation sensor 42, detects the amount of rotary movement. The circular rotating assembly 40 may additionally provide a light guide function for optical indication at the ring element 28. Further the circular rotating assembly 40 may be provided with a toothing to actuate a rotary potentiometer as a rotation sensor and/or a three-way sensor (instead of a light barrier), for example. The rotary movement of the rotary/push operating element 12 can alternatively be sensed by a Hall sensor, for example.

Figure 2:
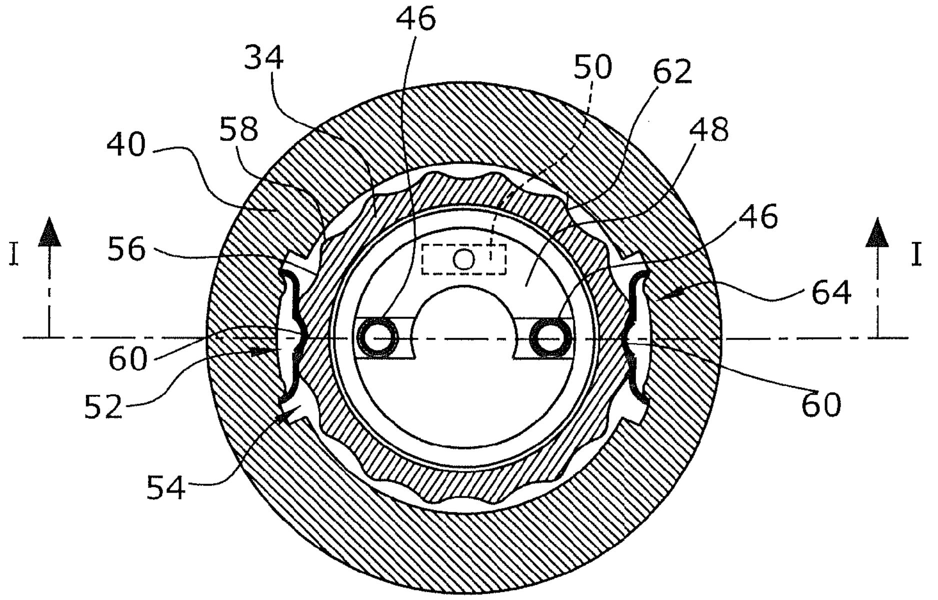
FIG. 2 shows a cross sectional view taken along the plane II-II in FIG. 1.

As can be seen in FIGS. 1 and 2, inside the area of the inner bearing ring 34, which axially protrudes beyond the guide shaft 14, an insert sleeve 44 expanded in upward direction and providing a reflector function, for example, is inserted. This insert sleeve 44 carries the fixed key body 26. The insert sleeve 44 is supported via two (e. g. for reasons of symmetry) return springs 46 opposite the carrier plate 16. At the carrier plate 16 a pressure sensor 50 is located in the area occupied by the insert sleeve 44, said pressure sensor 50 being configured as a limit switch and actuated by a projection 48 formed at the insert sleeve 44 in this exemplary embodiment.

When the rotary/push operating element 12 is depressed the springs 46 are compressed and the pressure sensor 50 is actuated. Once the depressing force is removed, the return springs 46 move the rotary/push operating element 12 back into the position shown in FIG. 1.

It should be mentioned here that other positions for the pressure sensor, the return springs and the pressure sensor are also feasible. For example, the return springs 46 could directly engage with the inner bearing ring 34. In the illustrated exemplary embodiment, the return springs 46 engage with an element rigidly connected with the inner bearing ring 34, namely the insert sleeve 44.

In particular, as can be seen in FIG. 2, a rotary arresting unit 52 comprising an arresting template 54 with alternatingly successively arranged (arresting) recesses 56 and raised portions 58 and, e. g. for reasons of symmetry, two spring-elastic arresting projections 60 is located between the inner bearing ring 34 and the circular rotating assembly 40 connected with the outer bearing ring 32. In this exemplary embodiment, the arresting template 54 is formed on the outside 62 of the inner bearing ring 34 (or a component arranged thereon) facing the circular rotating assembly 40, while the arresting projections 60 are retained at the circular rotating assembly 40. The arresting projections 60 may further be directly retained at the outer bearing ring 32. The two arresting projections 60 are formed by (metal) spring clips 64.

Figure 3:
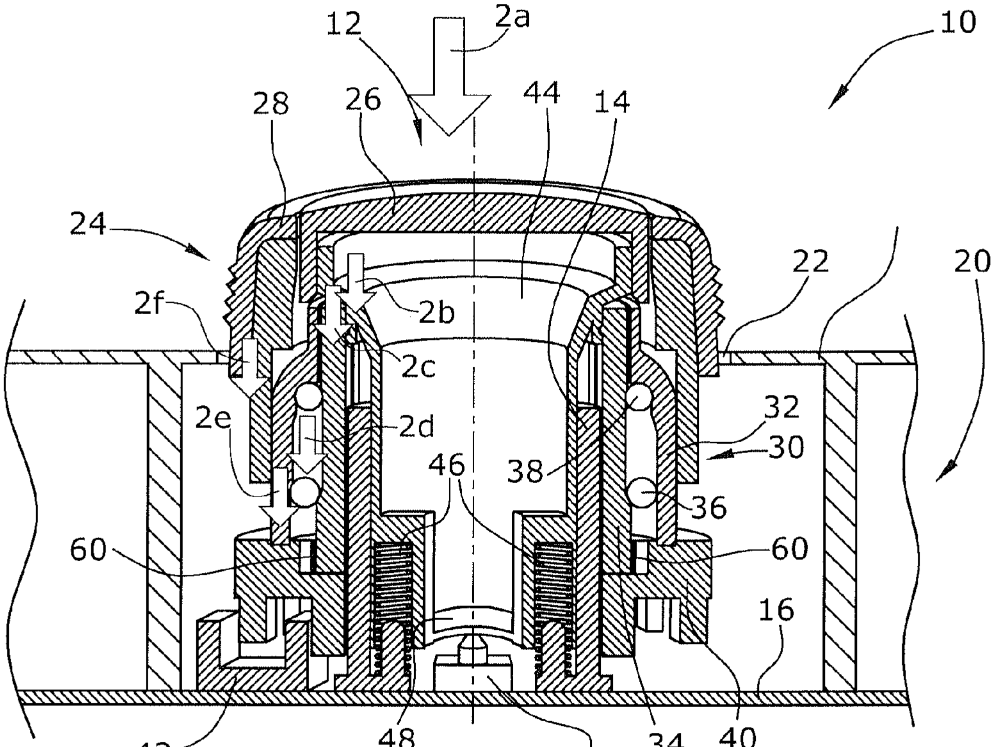
FIG. 3 shows the rotary/push operating device of FIG. 1 with an indicated line of flux when a depressing force is exerted on the center of the rotary/push operating device.
Figure 4:
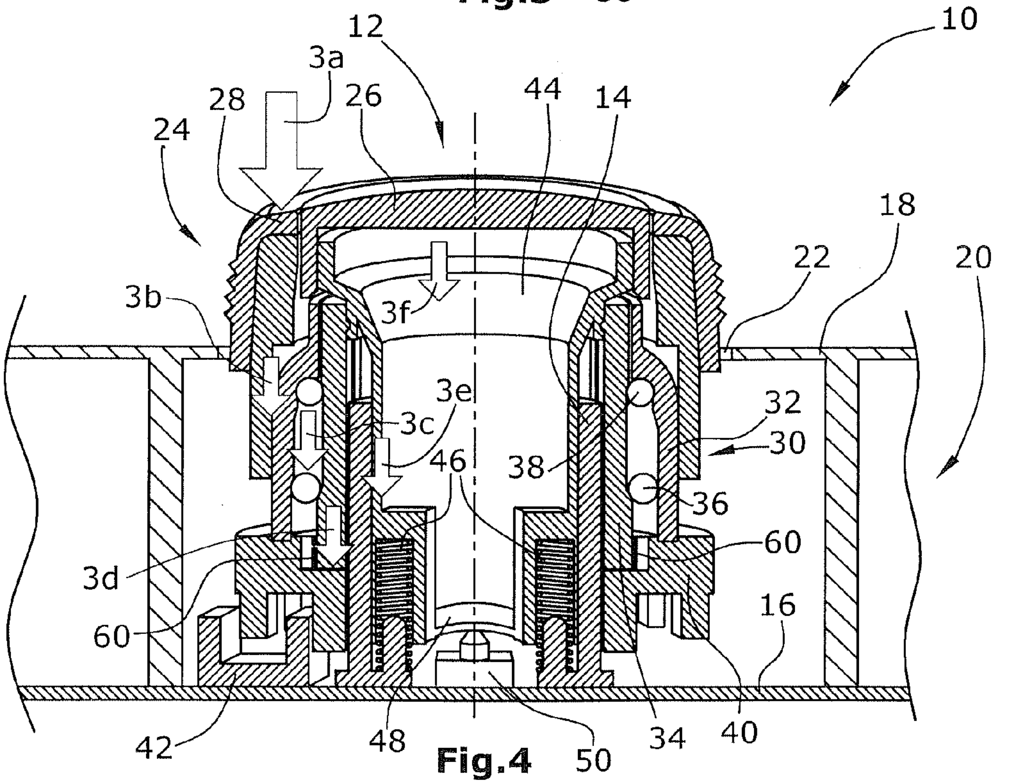
FIG. 4 shows the rotary/push operating device of FIG. 1 with an indicated line of flux when a depressing force is exerted on the edge area of the rotary/push operating device.

On the basis of FIGS. 3 and 4 the "entrainer concept" during a pushing actuation of the rotary/push operating element realized according to the invention is explained, which is indicated by the arrows 2*a* to 2*f* and 3*a* to 3*f*, respectively. According to FIG. 3, the depressing force is exerted on the key body 26 (see arrow 2*a*). By depressing the key body 26 the insert sleeve 44 is also depressed (see arrow 2*b*), namely against the force of the return springs 46. The insert sleeve 44 has connected therewith the inner bearing ring 34 through which its outer bearing ring 32 is also moved downwards via the rolling bodies 36, 38 of the rolling bearing unit 30 (see arrows 2*c*, 2*d* and 2*e*). The outer bearing ring 32, in turn, has rigidly connected therewith the ring element 28 of the rotary/push operating element 12 which is therefore moved downwards together with the key body 26 (see arrow 2*f*).

FIG. 4 shows the entrainer concept where the depressing force is exerted on the ring element 28 of the rotary/push operating element 12 (see arrow 3*a*). When the ring element 28 is depressed, the outer bearing ring 32 is depressed (see arrow 3*b*). Via the rolling bodies 36, 38 the outer bearing ring 32 entrains the inner bearing ring 34 (see arrow 3*c*). Thus this inner bearing ring 34 is also moved downwards (see arrow 3*d*). The inner bearing ring 34 has rigidly connected therewith the insert sleeve 44 which is also moved downwards (see arrow 3*e*) thus compressing the return springs 46. The insert sleeve 44 has rigidly connected therewith the key body 26 such that the latter is finally moved downward together with the ring element 28 (see arrow 3*f*).

LIST OF REFERENCE NUMERALS

10 Operating device
12 Rotary/push operating element
14 Guide shaft of the rotary/push operating element
16 Carrier plate in the housing
18 Front panel of the housing
20 Housing
22 Cavity in the front panel
24 Operating part of the rotary/push operating element
26 Key body of the operating part
28 Ring element of the operating part extending about the latter's key body
30 Rolling bearing unit
32 Outer bearing ring of the rolling bearing unit
34 Inner bearing ring of the rolling bearing unit
36 Rolling body
38 Rolling body
40 Circular rotating assembly
42 Rotation sensor
44 Insert sleeve
46 Return spring
48 Projection in the insert sleeve
50 Pressure sensor
52 Rotary arresting unit
54 Arresting template of the rotary arresting unit
56 Arresting recesses of the arresting template
58 Raised portions of the arresting template
60 Arresting projections
62 Outside of the inner bearing ring
64 (Metal) spring clip of the arresting projections

The invention claimed is:

1. A rotary/push operating device for a human-machine interface, in particular for a vehicle component, such as an air conditioning system, comprising a rotary/push operating element which is adapted to be rotated in a rotary movement about a guide shaft and to be axially moved along the guide shaft, a roller bearing unit having an outer bearing ring, an inner bearing ring and rolling bodies arranged, wherein one of the bearing rings is connected in a rotationally fixed manner and an axially fixed manner with the rotary/push operating element and is rotated and depressed therewith, a rotation sensor for sensing the rotary movement of the rotary/push operating element, a pressure sensor responding to an axial movement of the rotary/push operating element from a starting position into a depressed position along the guide shaft, and a return element for automatically moving back the rotary/push operating element from the depressed position into the starting position, wherein the return element directly or indirectly acts upon the roller bearing unit, and wherein the other one of the bearing rings is guided with the rotary/push operating element in an axially movable manner along the guide shaft and is secured against rotation at the latter.

2. The rotary/push operating device for a human-machine interface according to claim 1, further comprising a rotary arresting unit arranged between the inner bearing ring and the outer bearing ring or between a first component mechanically coupled with the inner bearing ring and a second component mechanically coupled with the outer bearing ring, wherein the rotary arresting unit includes an arresting template provided with arresting recesses and at least one arresting projection moving into and out of one of the arresting recesses, wherein the arresting template and the at least one arresting projection are adapted to be moved relative to each other, and wherein the arresting template and/or the at least one arresting projection is/are adapted to be elastically moved or deformed.

3. The rotary/push operating device according to claim 2, wherein the return element directly or indirectly acts upon the inner bearing ring of the rolling bearing unit.

4. The rotary/push operating device according to claim 2, wherein the return element comprises a coil spring.

5. The rotary/push operating device according to claim 1, wherein a plurality of return elements directly or indirectly act upon the rolling bearing unit.

6. The rotary/push operating device according to claim 1, wherein the rotary/push operating element is of an essential cap-shaped configuration having a front side and a circumferential side and comprising a fixed key body at its front side as well as a ring element adapted to rotate about the key body at its circumferential side, and that the key body is directly or indirectly connected with the inner bearing ring and the ring element is directly or indirectly connected with the outer bearing ring of the rolling bearing unit.

7. The rotary/push operating device according to claim 1, wherein the rolling bearing unit comprises two rows of rolling bodies axially spaced apart from each other along the guide shaft.

8. The rotary/push operating device according to claim 1, wherein the at least one arresting projection is configured as a (metal) spring clip.

9. The rotary/push operating device according to claim 1, wherein the rotary arresting unit is arranged at sides facing each other of the outer bearing and the inner bearing ring or of components mechanically coupled therewith.

* * * * *